United States Patent [19]

Chang

[11] Patent Number: 5,343,328

[45] Date of Patent: Aug. 30, 1994

[54] STRUCTURE OF AUTOMOBILE REAR-VIEW MIRROR

[76] Inventor: Shih-Pan Chang, No. 29, Wan Lien Lane, Wan Lien Li, Yuan Lin Town, Changhua, Taiwan

[21] Appl. No.: 114,624

[22] Filed: Sep. 2, 1993

[51] Int. Cl.⁵ .................... B60R 1/06; G02B 7/18; B60S 1/56
[52] U.S. Cl. ..................... 359/507; 359/509; 15/250.003; 454/142; 454/234; 454/241
[58] Field of Search .............. 359/507, 508, 509, 512, 359/514, 841, 871, 872; 15/250.001, 250.003; 454/69, 139, 141, 142, 188, 228, 234, 237, 241

[56] References Cited

U.S. PATENT DOCUMENTS

| | | | |
|---|---|---|---|
| 3,859,899 | 1/1975 | Mills | 359/509 |
| 4,439,013 | 3/1984 | Hagn et al. | 359/509 |
| 4,449,796 | 5/1984 | Janssen et al. | 359/507 |
| 4,898,458 | 2/1990 | McDonald | 359/509 |
| 4,963,011 | 10/1990 | Lu et al. | 359/509 |

FOREIGN PATENT DOCUMENTS

| | | | |
|---|---|---|---|
| 0069164 | 1/1983 | European Pat. Off. | 359/509 |
| 2704226 | 8/1978 | Fed. Rep. of Germany | 359/509 |
| 0265047 | 11/1987 | Japan | 359/509 |

Primary Examiner—Ricky D. Shafer
Attorney, Agent, or Firm—Beveridge, DeGrandi, Weilacher & Young

[57] ABSTRACT

An automobile rear-view mirror including a ventilation box attached to the mirror at an inner side adjacent to the automobile for passing a current of air during the movement of the automobile, a flow guide member attached to the mirror thereof at the bottom for guiding the current of air toward the mirror so as to remove moisture from the mirror, and a motor drive controlled to turn the flow guide member on a longitudinal axis thereof to change its angular position relative to the mirror.

1 Claim, 6 Drawing Sheets

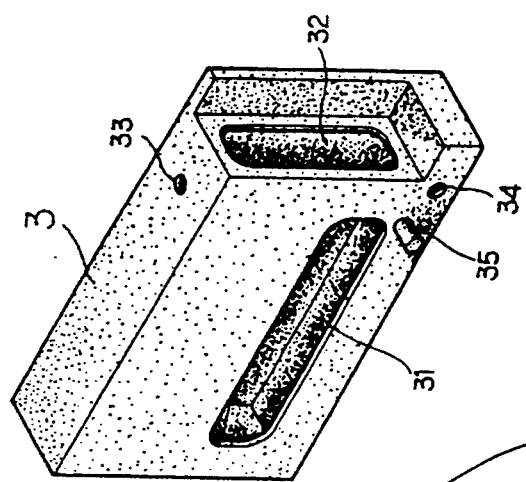
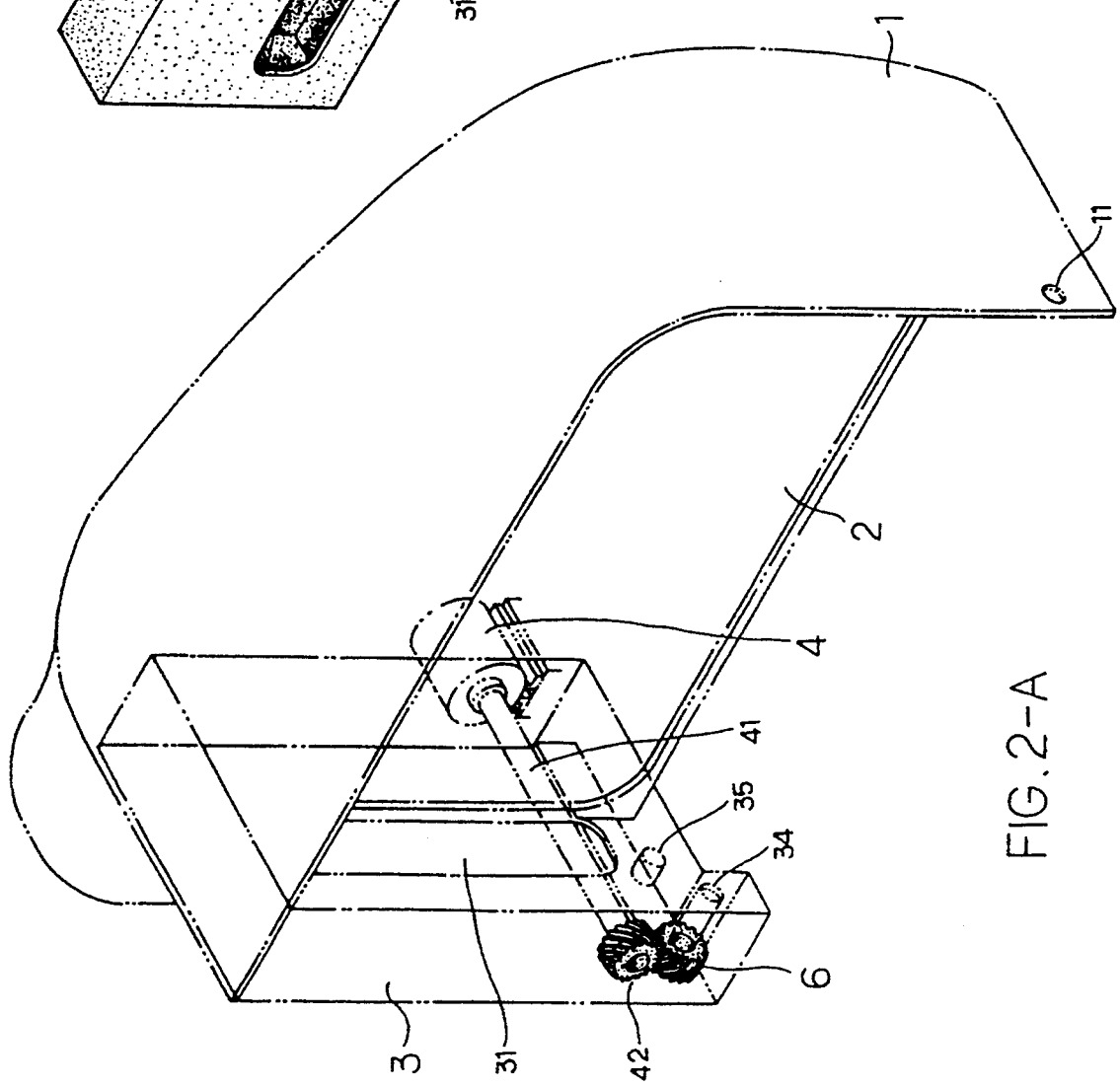

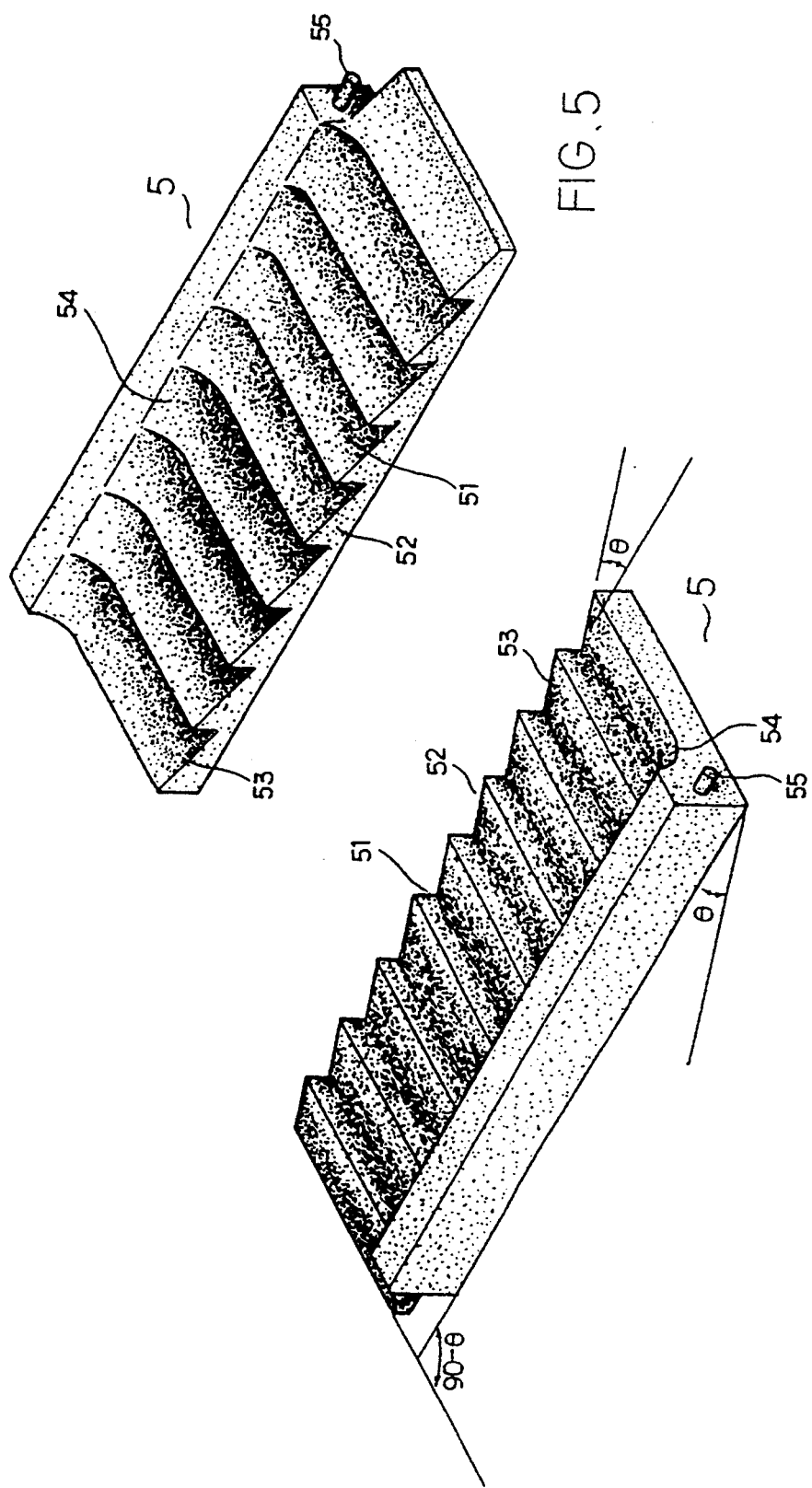

STRUCTURE OF AUTOMOBILE REAR-VIEW MIRROR

BACKGROUND OF THE INVENTION

The present invention relates to an automobile rear-view mirror which comprises a ventilation box on one side of the mirror thereof, and a flow guide member turned on a longitudinal axis thereof by a motor drive to guide a flow of air from the ventilation box toward the mirror so as to carry moisture away from the mirror.

The rear-view mirrors of an automobile are provided for letting the driver see traffic approaching from behind. These rear-view mirros, as shown in FIG. 1, are generally comprised of a mirror B pivotably fastened within a casing A. During a raining day, the mirror B may be covered with a mist. If the mirror of a rear-view mirror is covered with a mist, it can not clearly reflect the image. There is disclosed a rear-view mirror having a heater circuit controlled to generate heat for removing a fog from the mirror. The heater circuit becomes less effective in removing moisture from the mirror as the rain is getting heavier. There is another type of rear-view mirror which uses a brush controlled by a motor drive to clean the mirror automatically. However, the brush occupies much installation space on the mirror, and reciprocating the brush on the mirror simultaneously hinder the view of the driver in watching the mirror.

SUMMARY OF THE INVENTION

The present invention has been accomplished under the aforesaid circumstances. According to one aspect of the present invention, the automobile rearview mirror comprises a ventilation box attached to the mirror at one end. The ventilation box has a bottom opening on a horizontal bottom wall thereof, and a front opening on a vertical front wall thereof abutted to the mirror. As the automobile is moving, a flow of air is guided into the ventilation box from the bottom opening, and then guided out of the ventilation box through the front opening to flow toward the mirror so as to carry moisture away from the mirror.

According to another aspect of the present invention, a flow guide member is pivotably fastened to the ventilation box and attached to the mirror at the bottom for guiding the head wind toward the mirror. The flow guide member comprises a flow guide surface portion formed of a series of slopes respectively sloping downward toward toward the automobile. Each slope of the flow guide surface portion has one end smoothly curved upward toward the mirror. Therefore, the head wind is guided to pass through the mirror in carrying moisture away from the mirror as the automobile is moving.

According to still another aspect of the present invention, the flow guide member comprises a first pivot pin on one end thereof inserted in a pin hole on the casing of the rear-view mirror and a second pivot pin on an opposite end thereof inserted in a pin hole on the ventilation box and coupled to the output shaft of a miniature motor through a spiral gear set. By turning the miniature motor in either direction, the angular position of the flow guide member relative to the mirror is adjusted.

BRIEF DESCRIPTION OF THE DRAWINGS

FIG. 2A is a perspective view of the case assembly of the automobile rear-view mirror of FIG. 2;

FIG. 3 is an elevational view of a ventilation box according to the present invention;

FIG. 4 is an oblique view of a flow guide according to the present invention taken from the front side;

FIG. 5 is an oblique view of the flow guide of FIG. 4 taken from the rear side;

DETAILED DESCRIPTION OF THE PREFERRED EMBODIMENT

Figure 1:
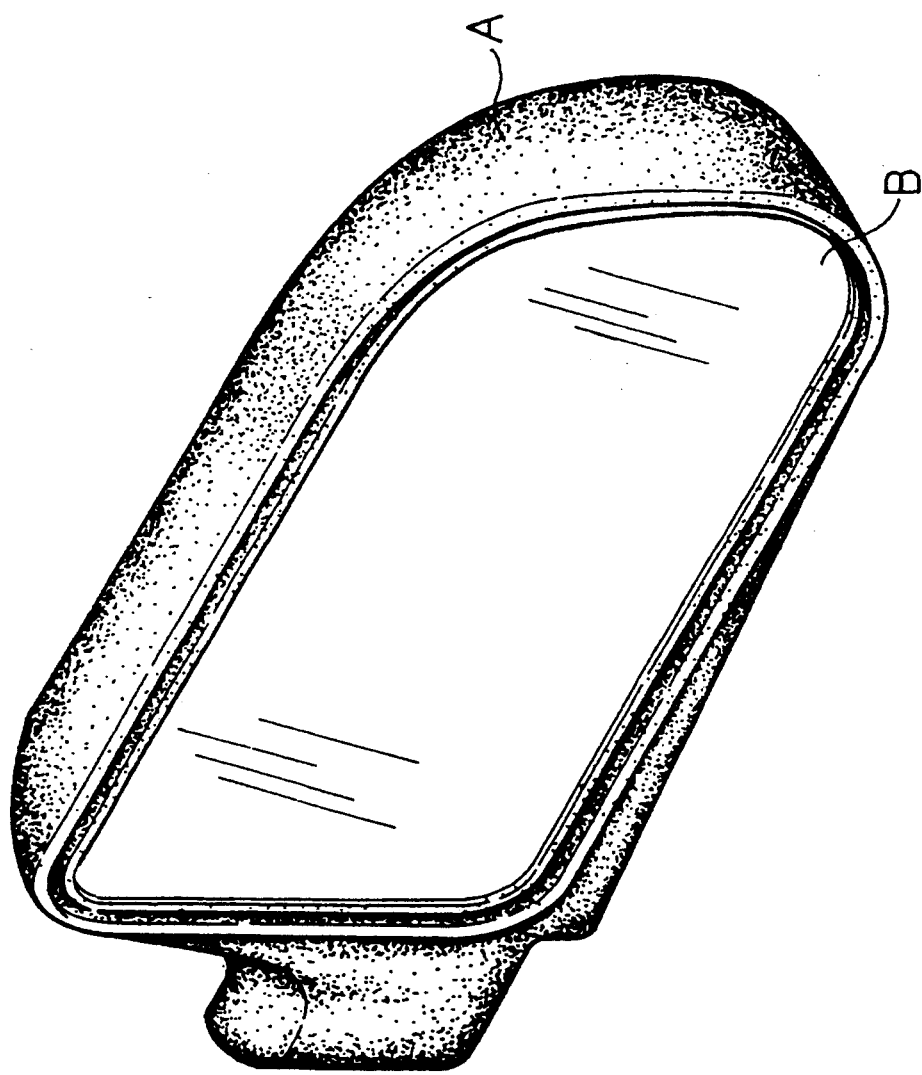
FIG. 1 is an elevational view of an automobile rear-view mirror according to the prior art.
Figure 2:
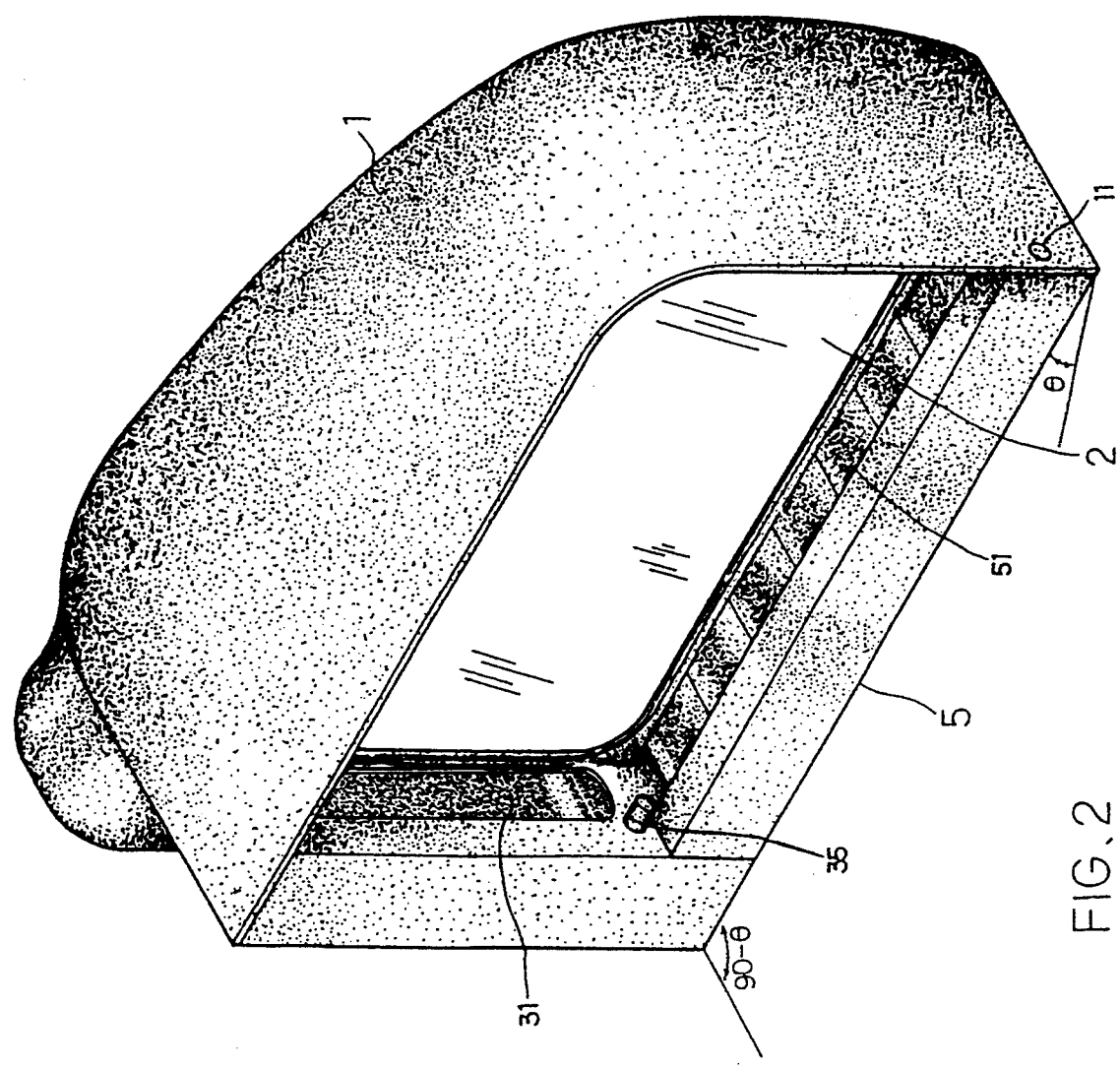
FIG. 2 is an elevational view of an automobile rear-view mirror according to the preferred embodiment of the present invention.

Referring to FIGS. 2, 3, 4, and 5, an automobile rear-view mirror in accordance with the present invention is generally comprised of a casing 1, and a mirror 2 mounted on the casing 1. A ventilation box 3 which is made in a substantially rectangular shape is fastened to the casing 1 and disposed at one side by the mirror 2 near the automobile, onto which the rear-view mirror is to be installed. The ventilation box 3 comprises an oblong front opening 31 longitudinally disposed on a front side thereof, an oblong bottom opening 32 on a bottom side thereof, a front through hole 34 through the front side, a stop rod 35 raised from the front side and disposed between the front oblong opening 31 and the front through hole 34, a side through hole 33 on one lateral side thereof. A miniature motor 4 is installed inside the casing 1, having an output shaft 41 inserted through the side through hole 34 and coupled with a spiral gear 42. A flow guide member 5 which is made in a substantially rectangular shape is fastened between the ventilation box 3 and the casing 1 and attached to the mirror 2 at the bottom. The flow guide member 5 comprises two pivot pins 55 longitudinally aligned on two opposite ends thereof near one side, one inserted in a pin hole 11 on the casing 1 and the other inserted through the front through hole 34 on the ventilation box 3 and coupled with a spiral gear 6 meshed with the spiral gear 42 on the output shaft 41 of the miniature motor 4. The flow guide member 5 further comprises a flow guide surface portion 51 formed of a series of slopes 52 sloping in the same direction. The slopes 52 are linked at one end, each having a bevel top surface 53 respectively sloping downward toward the front door of the automobile at an angle of inclination $\Theta$, a smoothly and upwardly curved surface 54 on one end abutted to one another.

Figure 6:
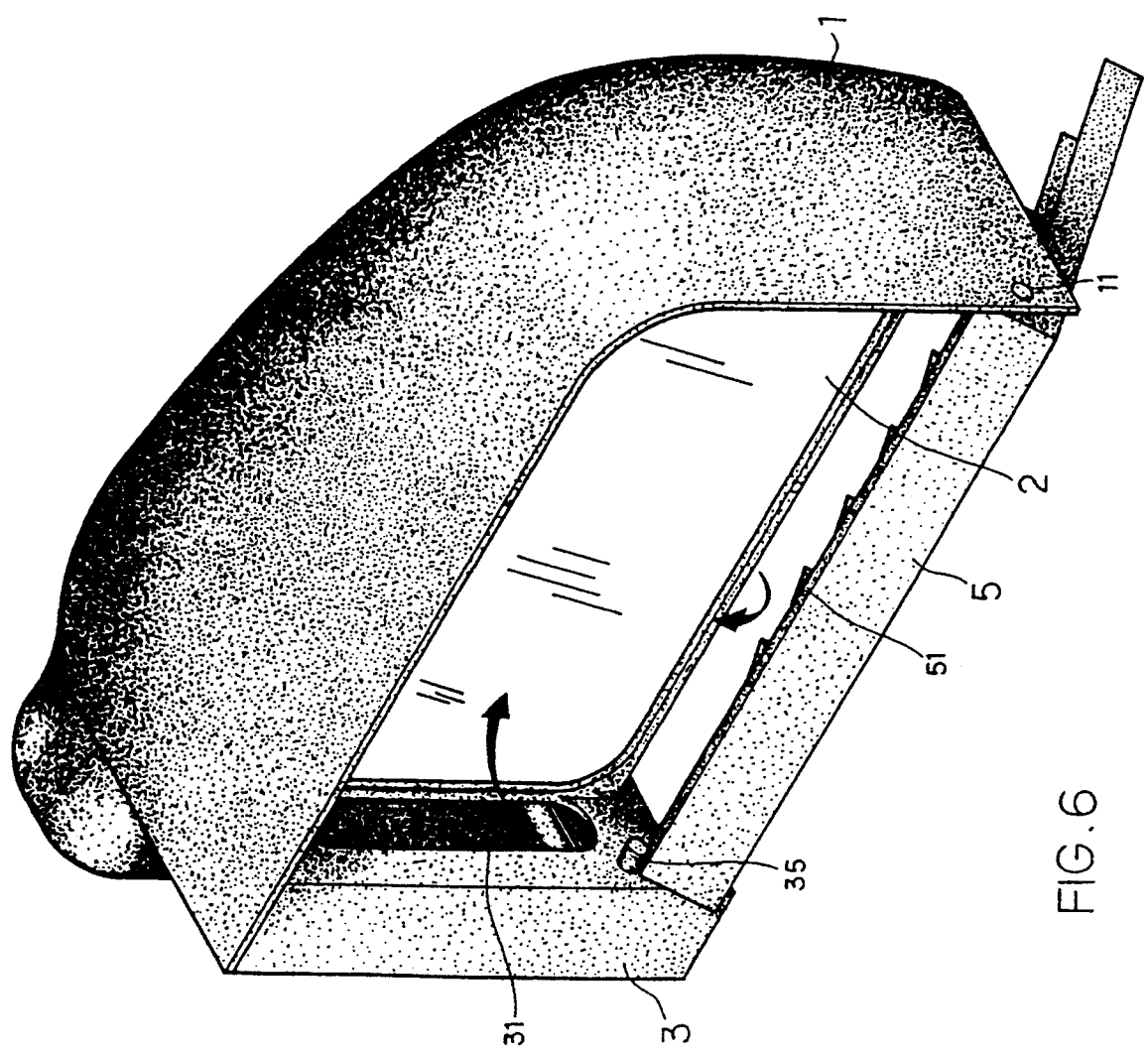
FIG. 6 shows the flowing direction of the flow of air passing through the automobile rear-view mirror of FIG. 2.
Figure 7:
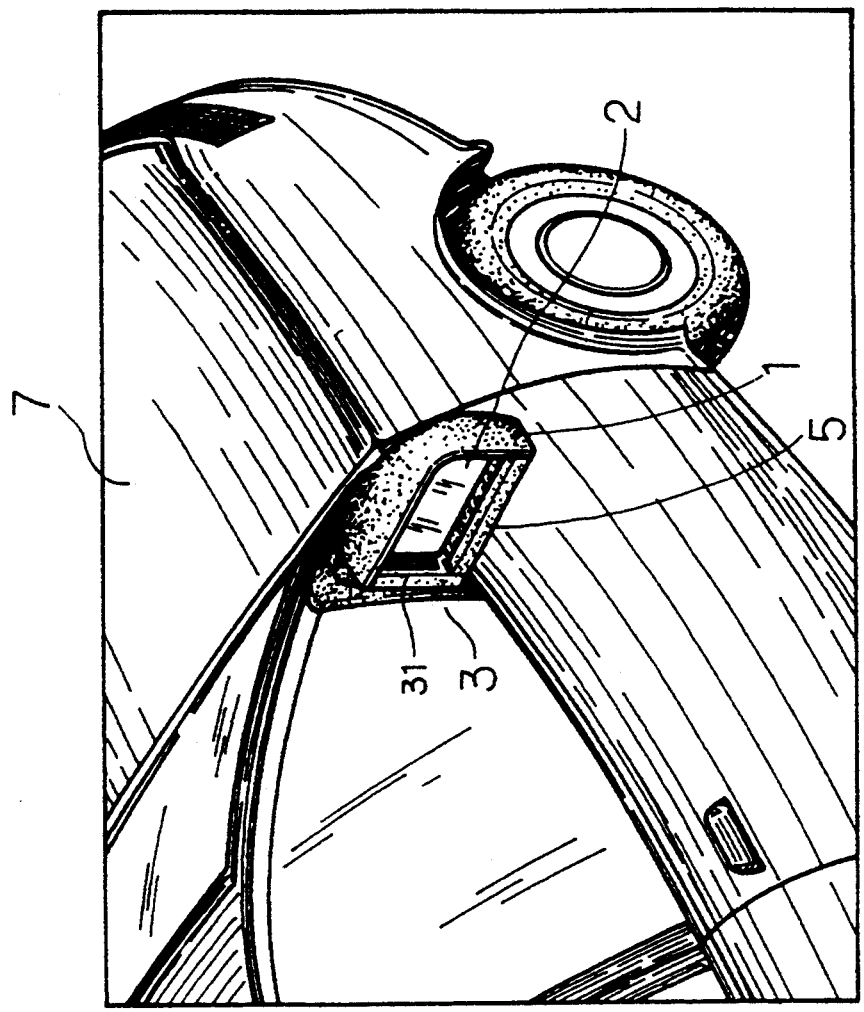
FIG. 7 is an installed view showing the automobile rear-view mirror installed in an automobile.

Referring to FIGS. 2A, 6, and 7, as the rear-view mirror is installed in the automobile 7, the miniature motor 4 is connected to the electric circuit of the automobile 7 and controlled by a switch (not shown). When installed, the angular position of the flow guide member 5 can be adjusted by means of the control of the miniature motor 4. As the miniature motor 4 is started to turn its output shaft 41, the spiral gears 42;6 are moved to turn flow guide member 5 for guiding a current of air passing through the mirror 2. As the flow guide member 5 is stopped by the stop rod 35 of the ventilation box 3, it is disposed at the maximum angle of inclination. As the mirror 2 of the rear-view mirror is disposed at 90°-Θ angle relative to the automobile 7, and the contained angle between the bevel top surface 53 and the mirror 2 is within 90°-Θ angle, therefore the flow guide surface portion 51 of the flow guide member 5 is disposed in the same direction of the body of the automobile. As the automobile 7 is moving, the head wind is guided through the ventilation box 3 through the bottom opening 32 and the front opening 31, and then guided by the series of slopes 52 of the flow guide surface portion 51 to flow toward the mirror 2. As the current of air passes through the mirror 2, the mist on the mirror 2, if any, will be simultaneously carried away.

What is claimed is:

1. An automobile rear-view mirror of the type having a mirror fastened within a casing installed on an automobile for seeing traffic approaching from behind, the improvement comprising a ventilation box fastened to said casing and attached to said mirror at one side nearest the automobile, a flow guide member connected between said ventilation box and said casing and horizontally attached to said mirror at the bottom, a motor drive comprised of a miniature motor and a transmission gear and controlled to turn said flow guide member on a longitudinal axis thereof to change its angular position relative to said mirror, said ventilation box having a front opening disposed on a vertical front side thereof adjacent to said mirror and a bottom opening disposed on a horizontal bottom thereof communicated with said front opening, said flow guide member comprising a flow guide surface portion formed of a series of slopes respectively sloping downward toward said automobile, each slope having one end curved upward toward said mirror, whereby a current of air passes through said ventilation box from said bottom opening to said front opening as the automobile is moving, and then is guided by said flow guide member to flow toward said mirror to further carry moisture from said mirror.

* * * * *